Patented Dec. 11, 1928.

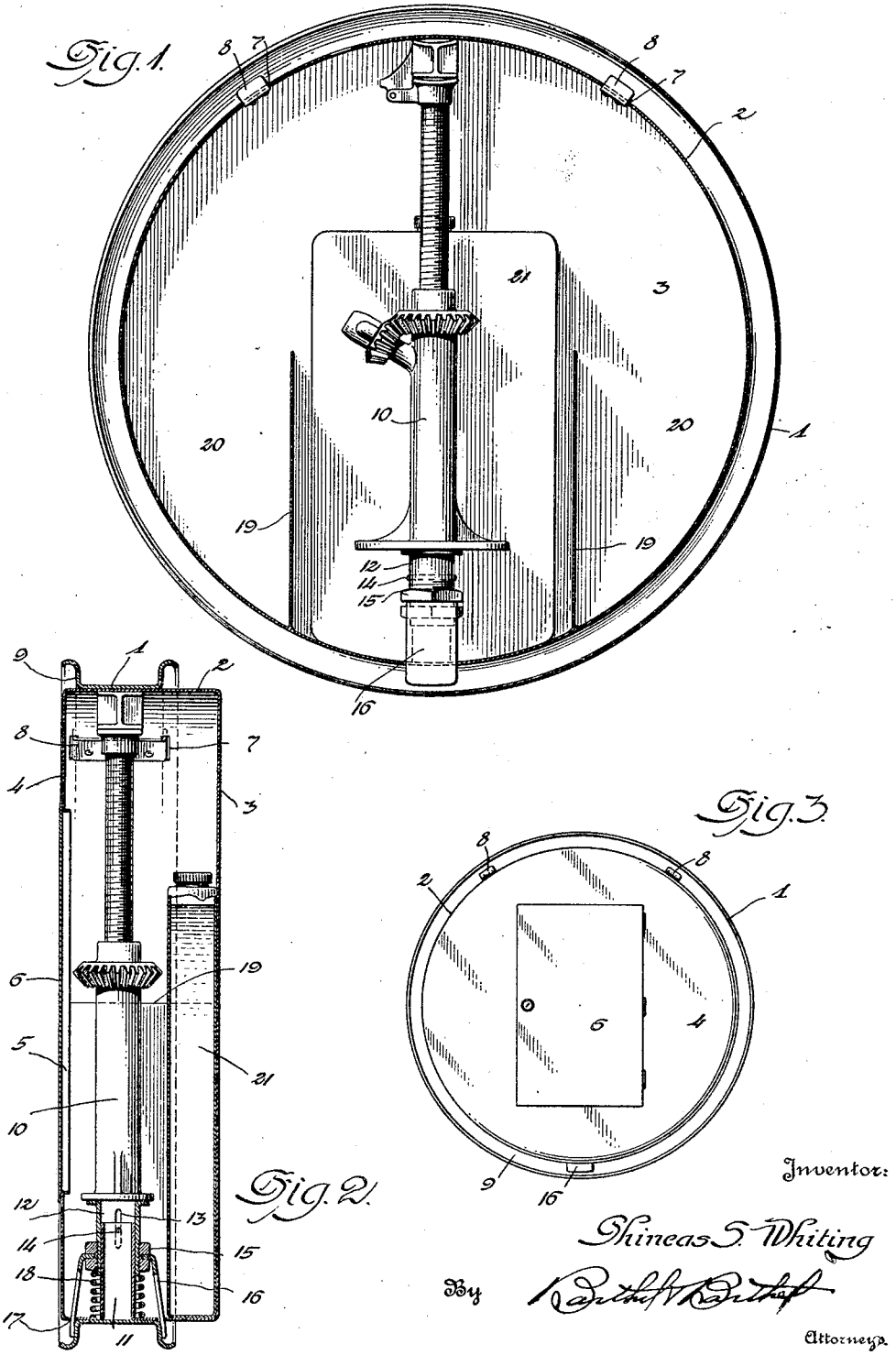

1,694,634

UNITED STATES PATENT OFFICE.

PHINEAS S. WHITING, OF ROYAL OAK, MICHIGAN.

TOOL CONTAINER FOR TIRE CARRIERS.

Application filed December 14, 1925. Serial No. 75,312.

This invention relates to a tool container for tire carriers, and has special reference to spare tire carriers of automobiles and other vehicles which are ordinarily supported with the central part of the carrier vacant. It is in this vacant space that I place a container for tools, emergency supplies, or such other matter for the convenience of the operator of an automobile.
My invention aims to provide a container that may be easily and quickly attached to a tire carrier, and in the container is jack supporting means by which a jack will be held in proximity to a door equipped doorway of the container so that the jack can be easily removed. The jack supporting means includes a movable clip which cooperates with fixed clips of the container in detachably connecting the container to the carrier.
My invention further aims to provide a simple, durable, inexpensive and dust proof container having compartments for various tools or other matter, and the construction of the container will be hereinafter specifically described and then claimed.

Reference will now be had to the drawing, wherein—

Figure 1 is a vertical longitudinal sectional view of the container showing a jack therein;

Fig. 2 is a vertical cross sectional view of the same, and

Fig. 3 is a front elevation of the container.

In the drawing, the reference numeral 1 denotes a conventional form of cylindrical spare tire carrier which is ordinarily supported at some convenient place on an automobile or other vehicle. The carrier affords a circular space in which I mount a container, comprising a cylindrical wall 2, a rear wall 3, and a front wall 4, said front wall having a flanged doorway 5 and a hinged lock equipped door 6.

The upper portion of the cylindrical wall 2 is provided with spaced sets of slots 7, the distance between the slots of each set approximating the width of the carrier 1, so that U-shaped clips 8, suitably fixed to the wall 2, may extend through the slots 7 and engage the side flanges 9 of the carrier 1.

On the lower portion of the container wall 2 are jack supporting means by which the upper end of a jack 10 may be held against the upper portion of the wall 2. The jack supporting means includes a tubular post 11 suitably fixed to the lower portion of wall 2. Telescoping the post 11 is a slidable supporting member 12 having opposed longitudinal slots 13 for the ends of a transverse pin 14, carried by the post 11, said pin limiting the sliding movement of the supporting member 12 on the post 11. The upper end of the supporting member 12 forms a seat for the base of the jack 10. On the lower screw-threaded end of the supporting member 12 are nuts or retaining members 15 holding an inverted U-shaped clip 16 adapted to protrude through slots 17 in the bottom of the container and engage the side flanges 9 of the carrier 1.

Encircling the post 11 is a coiled expansion spring 18 which presses against the lowermost nut 15 and holds the supporting member 12 normally elevated, with the jack 10 clamped between the supporting member 12 and the upper wall 2 of the container.

The container has the lower portion thereof provided with vertical partitions 19 forming compartments 20 for tools or other matter, and a reserve liquid receptacle 21 may be placed in the container, against the rear wall 3 and between the partitions 19. The liquid container 21 may be one of a plurality of containers holding gasoline, oil or water for emergency purposes.

The container can be easily fitted in the carrier 1, the clips 8 placed in position to anchor the upper portion of the container, and then the clip 16 shifted into engagement with the carrier when the jack 10 is placed on its supporting means.

The container may be made of light and durable metal, finished to conform to adjacent metallic parts of an automobile, and while in the drawing there is illustrated a preferred embodiment of my invention, it is to be understood that the structural elements are susceptible to such variations and modifications as fall within the scope of the appended claims.

What I claim is:—

1. In a tire carrier, a container adapted to fit in said tire carrier and supported thereby, a tool adapted to have its upper end pressed against the upper portion of said container, and a spring pressed telescopic holder in the lower part of said container supporting the lower end of said tool and constantly exerting an upward pressure against said tool.

2. In a tire carrier, a container supported in said carrier, spaced apart means on the upper portion of said container engaging opposite sides of said carrier for preventing displacement of said container, and spring pressed means in said container extending through the bottom wall thereof adapted to cooperate with said spaced apart means in holding said container in said carrier, said spring pressed means including a retaining member on which a tool may be seated and held against a wall of said container.

In testimony whereof I affix my signature.

PHINEAS S. WHITING.